(12) United States Patent  
Cartwright

(10) Patent No.: US 8,635,803 B1  
(45) Date of Patent: Jan. 28, 2014

(54) BUOYANT FISHING DEVICE

(76) Inventor: Mark A. Cartwright, Baton Rouge, LA (US)

( * ) Notice: Subject to any disclaimer, the term of this patent is extended or adjusted under 35 U.S.C. 154(b) by 295 days.

(21) Appl. No.: 13/043,354

(22) Filed: Mar. 8, 2011

(51) Int. Cl.
*A01K 85/01* (2006.01)

(52) U.S. Cl.
USPC ............. 43/17; 43/43.14; 43/44.88; 43/44.92

(58) Field of Classification Search
USPC ......... 43/17, 43.14, 44.88, 44.92, 44.9, 43.12
See application file for complete search history.

(56) References Cited

U.S. PATENT DOCUMENTS

| | | | | |
|---|---|---|---|---|
| 2,493,971 | A * | 1/1950 | Johnson | 43/44.91 |
| 5,852,894 | A * | 12/1998 | Shannon et al. | 43/17 |
| 6,009,659 | A * | 1/2000 | Shannon et al. | 43/44.91 |
| 6,425,200 | B1 * | 7/2002 | Bennis | 43/44.91 |
| 6,431,931 | B2 * | 8/2002 | Johnson | 441/6 |
| 2009/0249679 | A1 * | 10/2009 | Huppert | 43/43.14 |

* cited by examiner

*Primary Examiner* — Christopher P Ellis
(74) *Attorney, Agent, or Firm* — Roy Kiesel Ford Doody & Thurmon

(57) ABSTRACT

A buoyant fishing device with a housing having a first end and a second end and containing an elongated passageway having an axis, at least one weight disposed within the passageway, wherein the housing is further configured to float with the axis oriented substantially perpendicular to gravity when the weight is in the first position and wherein the housing is further configured to float with the axis oriented substantially parallel to gravity when the weight is in the second position.

12 Claims, 7 Drawing Sheets

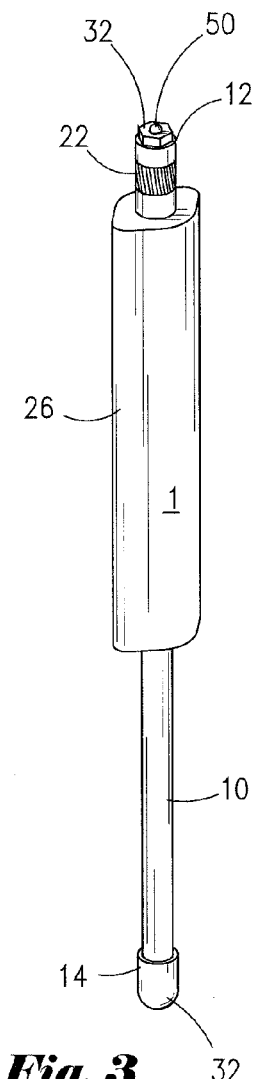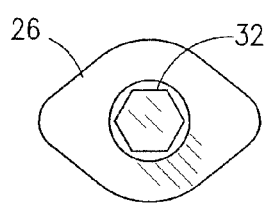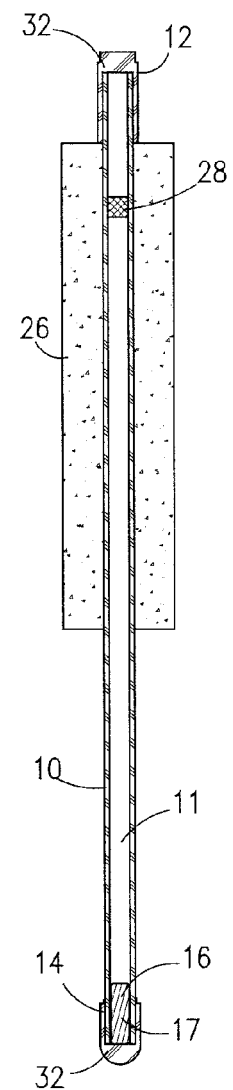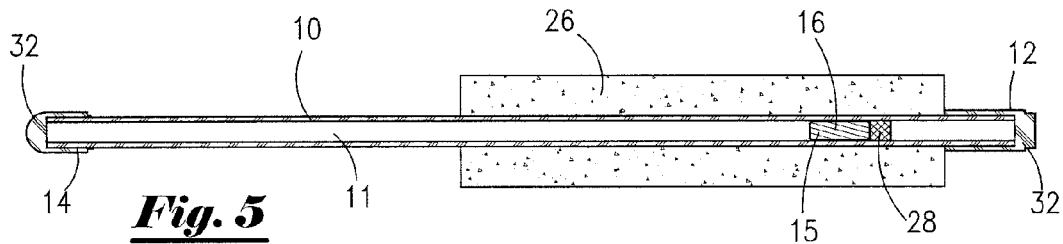

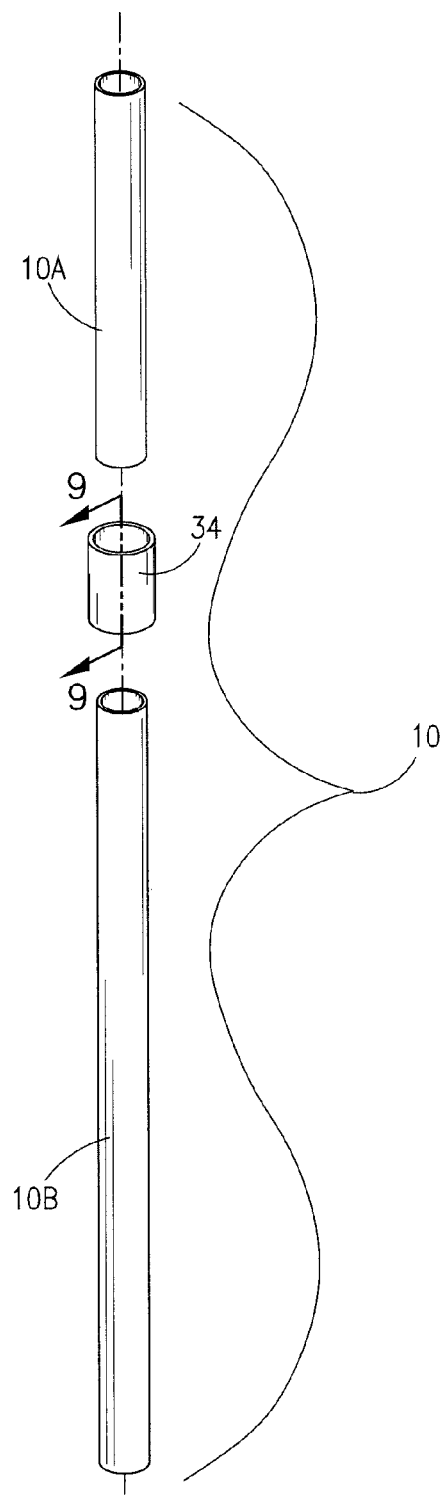
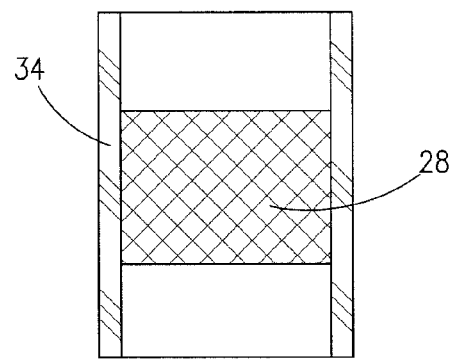
Fig. 9
Fig. 8

BUOYANT FISHING DEVICE

BACKGROUND OF THE INVENTION

1. Field of the Invention

The invention relates to fishing devices in general and to jug fishing devices in particular.

2. Prior Art

Jug fishing is a foam of setline fishing which involves the use of a floatation device attached to a fishing line. The commonly called "jugline" can be any buoyant container from an empty milk carton to a specially made jugfishing device. Jugfishing can be used to catch many varieties of fish. However, the method of jug fishing is particularly effective in catching catfish. There are two main varieties of juglines, either free floating or drifting juglines and anchored juglines. The disadvantage of the free floating juglines is that they are more difficult to control, and the user cannot predict where the current will take the free floating juglines, especially when a fish has taken the bait. Anchored juglines provide more user control and greatly decrease the unpredictability of movement. Also, anchored juglines provide resistance to the pull of a fish on the line allowing the user to capture the line and its fish with greater ease.

Fisherman use juglines because of their versatility and ease of use. A jugline can be preassembled and set in a matter of minutes, cutting down on time preparing to fish and allowing the fisherman to have multiple active juglines at one time. Once a fish has taken the bait, it is important that the user have a way of determining that a fish is on the line to avoid losing the fish and/or valuable equipment in the event of the fish getting away or breaking the equipment. Similarly, it is useful for the fisherman to be able to tell which lines have a fish on in order to allow the fisheiman to save time by not running lines that do not have a fish.

In the prior art, there are several ways for the user to determine when a fish has taken the bait on his jugline, including auditory indications and visual indications. An auditory indication can be difficult to detect when the user is far from the jugline, a problem that is likely to present itself when the user has set multiple juglines over a large area. Also, the sounds of the environment may inhibit the user's ability to detect the signal. Thus, a visual indicator may eliminate the problem of the user being unable to detect an auditory signal.

A visual indicator is seen in the prior art in the form of a device that floats in a nearly horizontal position initially. After a fish has engaged the hook and line that depend from the float, the float changes its orientation to vertical. The change in orientation of the device from a near horizontal floating position to a vertical floating position is caused by a free sliding object positioned within the device. However, when utilizing a visual indicator, the user is in danger of receiving a false positive in the form of a shift in the object inside of the hollow of the jugfishing device without a fish being attached to the line. The water current, the movement of animals in the water, the wake from vessels in the water, and wind are all potential sources of motion which can cause these false positives. Similarly, "nibbles" that do not result in a hook up with a fish may result in a false positive indication. In light of these problems in the prior art, an improved jug fishing device meeting the following objectives is desired.

OBJECTS OF THE INVENTION

It is an object of the invention to provide a fishing device which reduces false positives from sources other than fish on the line.

It is another object of the invention to provide a fishing device which does not move from horizontal floatation to vertical bobbing until a certain threshold of force is reached.

It is still another object of the invention to provide a fishing device which allows the user to determine with greater certainty the presence of a fish on the line.

It is yet another object of the invention to provide a fishing device which exhibits an improved visual indicator of a fish on the line.

BRIEF DESCRIPTION OF THE DRAWINGS

FIG. 3 is a side view of buoyant fishing device.

FIG. 4 is an end view of buoyant fishing device depicting cap.

FIG. 6 is a cross section of buoyant fishing device taken at line 6-6 of FIG. 2.

FIG. 8 is an exploded view of an alternate embodiment of buoyant fishing device.

FIG. 9 is a cross section along line 9-9 of the alternate embodiment shown in FIG. 8.

SUMMARY OF THE INVENTION

Figure 1:
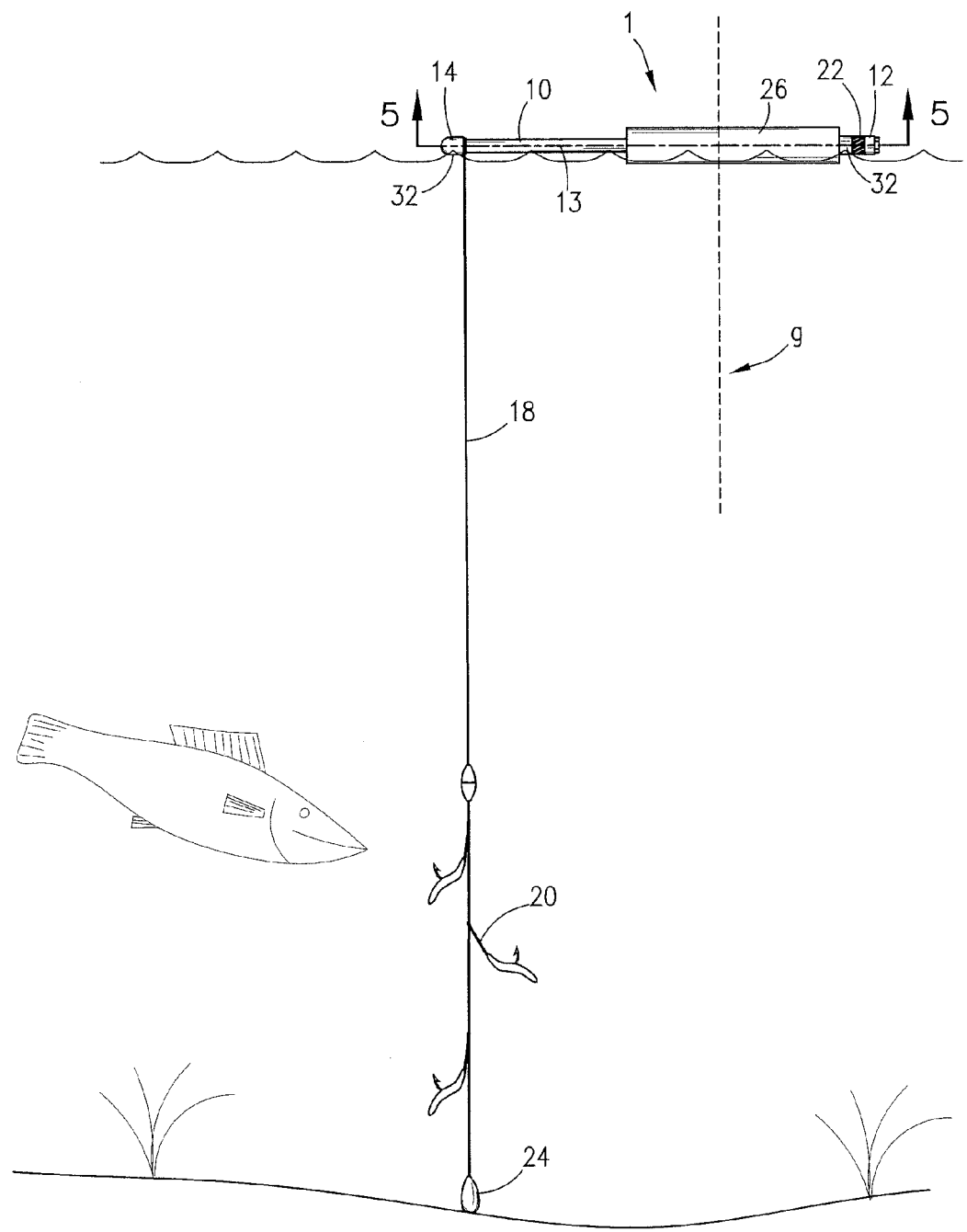
FIG. 1 is a side view of an embodiment depicting buoyant fishing device positioned upon a water body in anticipation of a fish.
Figure 2:
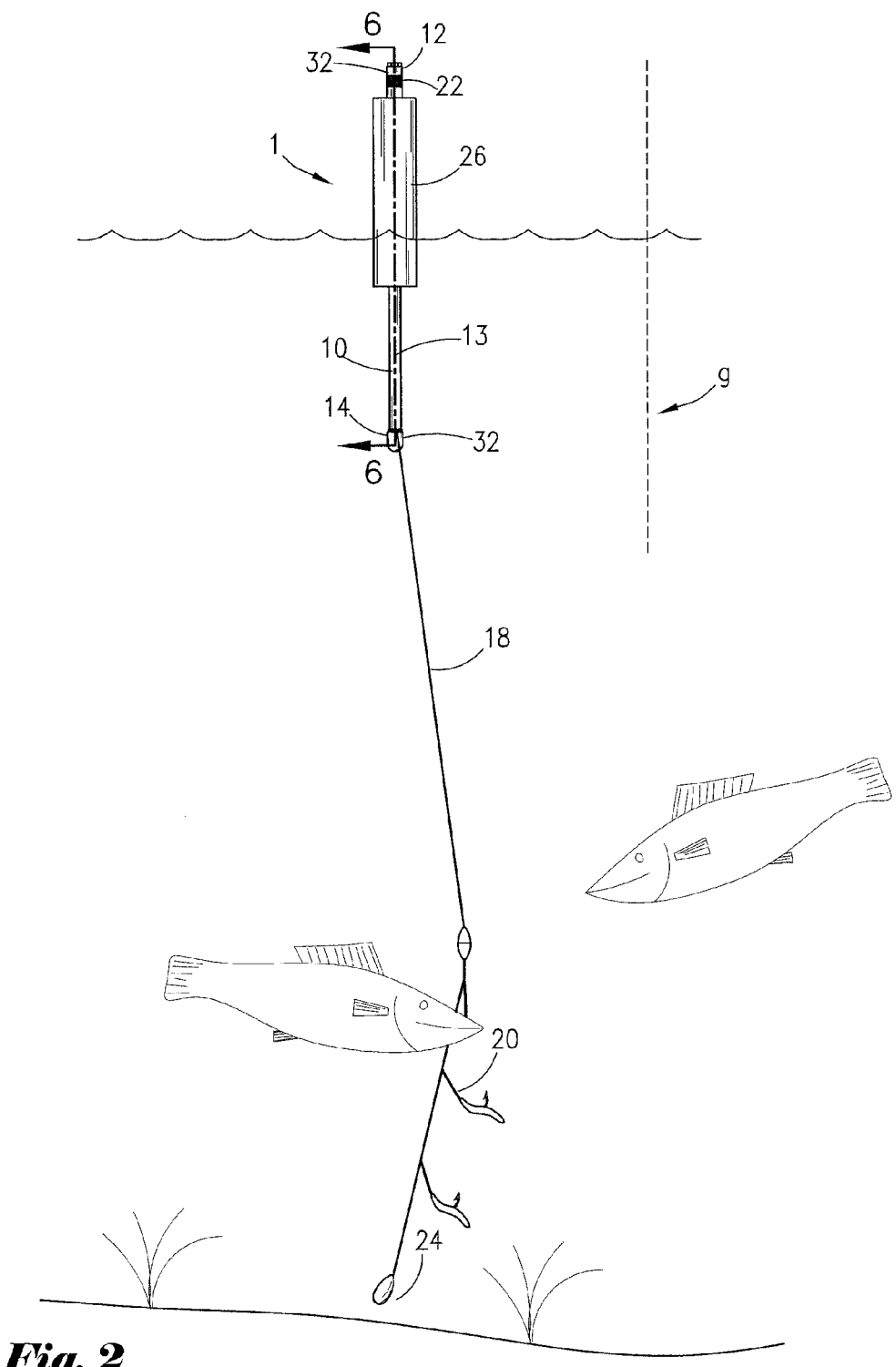
FIG. 2 is a side view of an embodiment depicting buoyant fishing device positioned upon a water body with a fish attached to line.
Figure 5A:
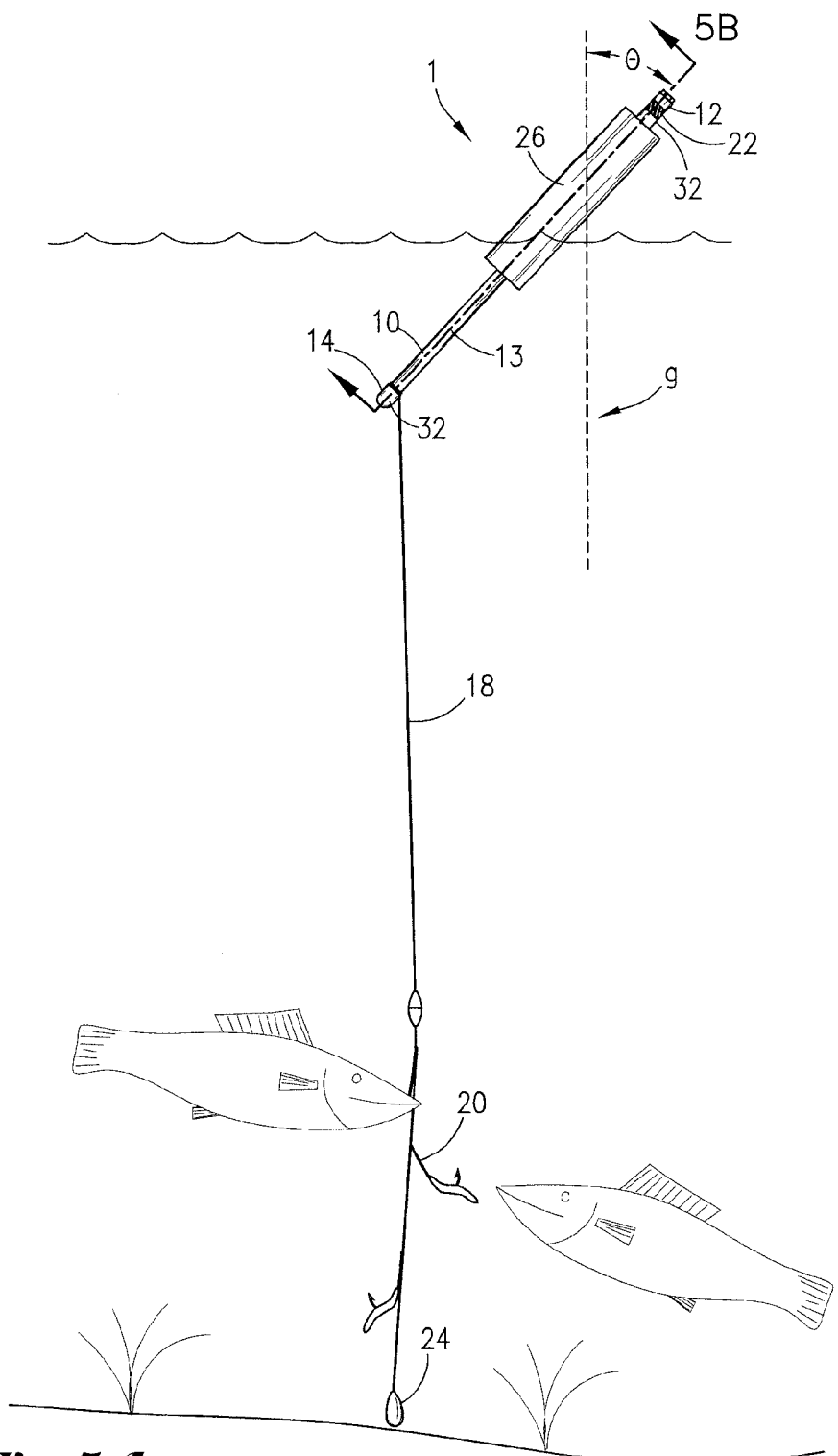
FIG. 5 is a cross section of buoyant fishing device taken at line 5-5 of FIG. 1.
Figure 5B:
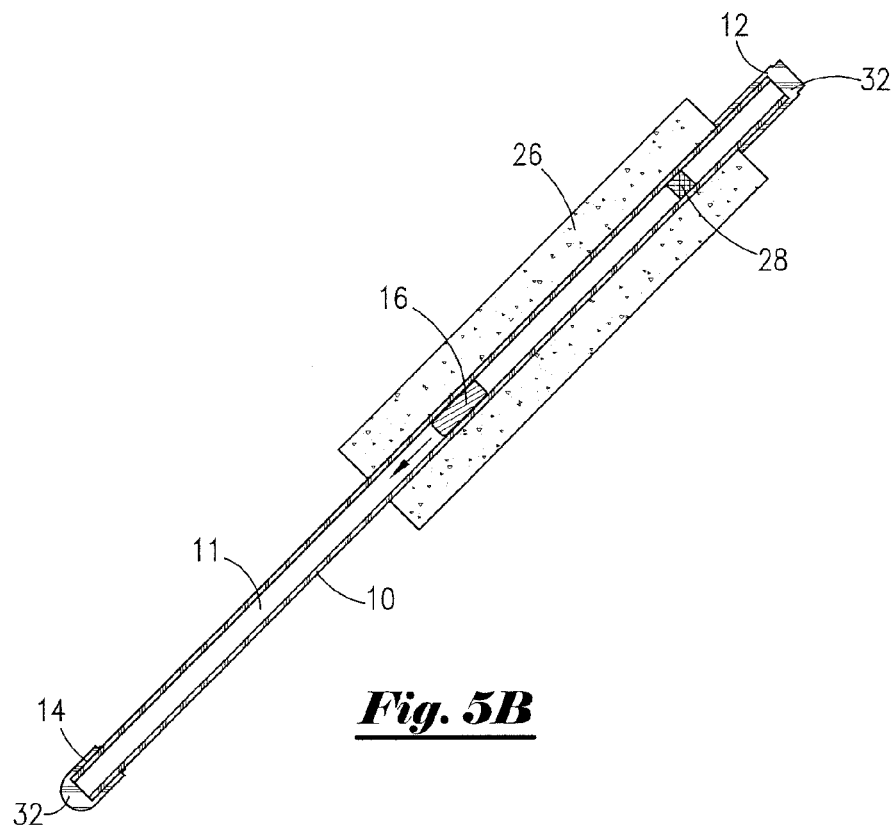
Figure 10:
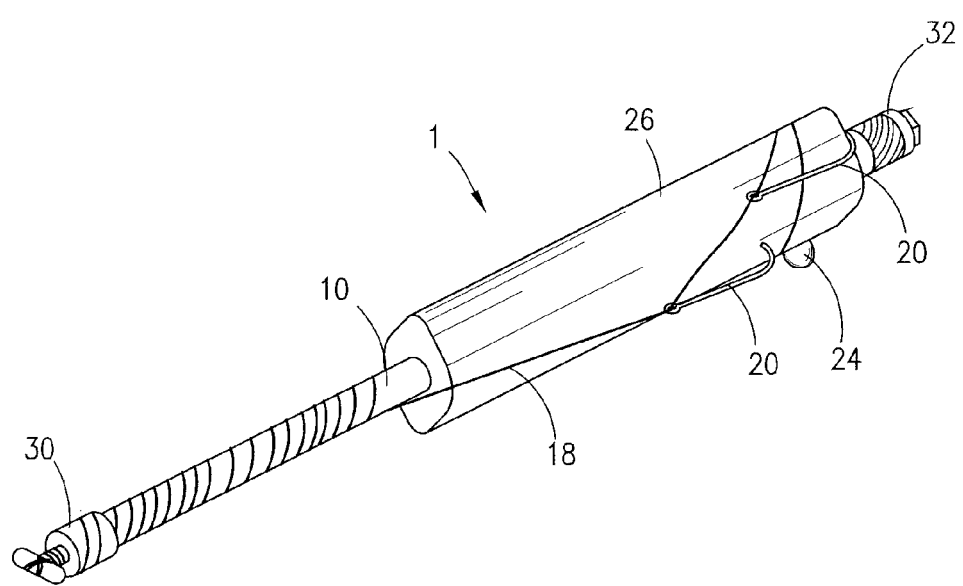
FIG. 10 is a perspective view of an alternate embodiment of buoyant fishing device.
Figure 7:
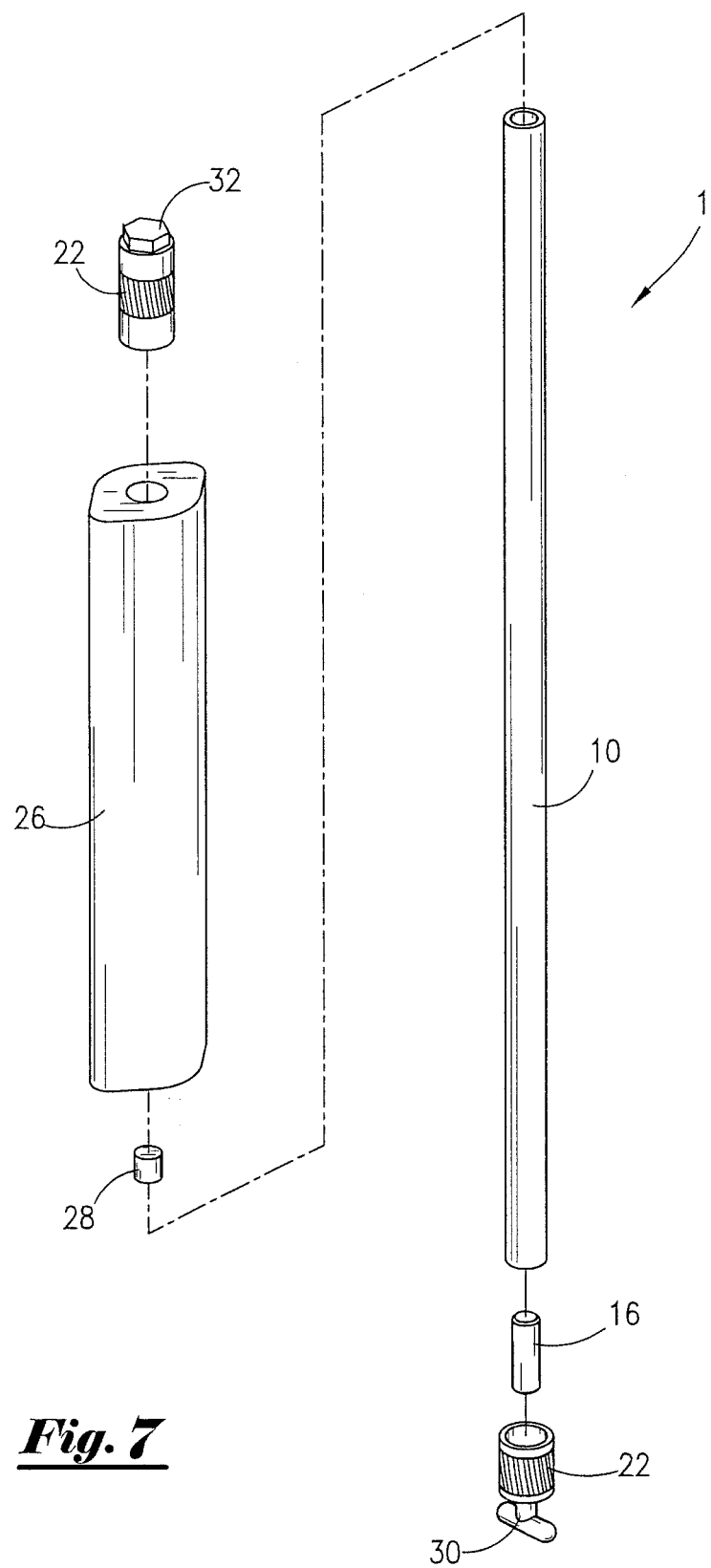
FIG. 7 is an exploded view of buoyant fishing device.

According to the present invention, a buoyant fishing device is disclosed which allows a user to set buoyant fishing device upon a body of water and observe buoyant fishing device from a distance. Buoyant fishing device is configured to hold a weight in a first position until triggered by a fish which will cause the weight to move to a second position. Changing the position of the weight will cause the buoyant fishing device to shift from floating in a horizontal orientation to floating in a vertical orientation. The weight is preferably secured in the first position until the buoyant fishing device reaches a predetermined optimum angle relative to gravity. Requiring the buoyant fishing device to reach the predetermined angle before the weight will shift positions and the buoyant fishing device will change orientation will result in fewer false positive indications of a strike.

DETAILED DESCRIPTION OF THE INVENTION

A buoyant fishing device 1 is disclosed herein. In an embodiment, the buoyant fishing device 1 has a housing 10 which has a passageway 11 which is substantially hollow. Housing 10 can be made of any material that provides a hollow passageway. Ideally, housing 10 will be durable, resistant to leakage, and will not hinder the floatation ability of buoyant fishing device 1. Housing 10 has a first end 12 and a second end 14.

Axis 13 extends from first end 12 to second end 14. Housing 10 may be any length which allows for flotation of buoyant fishing device 1. In one embodiment, housing 10 is about 20 inches long.

In a preferred embodiment, housing 10 can be made of polyvinyl chloride ("PVC") pipe. Although housing 10 and the various attachments thereto are described as being preferably water tight or resistant to leaking, it will be appreciated that housing 10 need not be water tight. As long as housing 10 is buoyant—even if that buoyancy is provided by external flotation devices—housing 10 will work. However, by making housing 10 substantially water tight, the longevity of the internal components of housing 10 will be enhanced and the buoyancy of housing 10 will be enhanced by the air trapped within.

Additionally, buoyant fishing device 1 may be provided with a foam fitting 26 positioned about the exterior of housing 10. Foam fitting 26 can be composed of any material which aids in floatation of buoyant fishing device 1 and can be secured onto or over housing 10. Examples include closed-cell extruded polystyrene foam (Styrofoam™), expanded polystyrene beads, and any other material which complies with the above requirements. In a preferred embodiment, length of foam fitting 26 is between 35 and 55 percent of the length of housing 10.

Foam fitting 26 may have a cross section that is round, triangular, rectangular, oval, octagonal, etc. However, shapes with flat surfaces have one advantage over round shapes. If a fish is on buoyant fishing device 1 and line 18 (discussed below) is spooled around foam fitting 26, force applied to line 18 will be more likely to unwind the spooled line 18 if foam fitting 26 is round than if foam fitting 26 is contains one or more flat surfaces.

A weight 16 can be located in passageway 11 between first end 12 and second end 14. Housing 10 is configured such that weight 16 is engaged in a first position 15 when axis 13 of housing 10 is oriented substantially perpendicular to gravity. Weight 16 can be disengaged when axis 13 of housing 10 moves toward an orientation that is substantially parallel to gravity. Weight 16 can have a cross section that is round, square, rectangular, triangular or any shape which facilitates movement within housing 10. One convenient source of weight 16 is reinforcing steel, known as rebar. The size of weight 16 is determined by the diameter of the cross section of housing 10. When one inch external diameter PVC pipe is used to construct housing 10, weight 16 can be a section of size #4 rebar which is indicative of its diameter in ⅛'s of an inch, such that #4 rebar has a diameter of about ½ of an inch. Additionally, weight 16 can be a rod, ball, spiral, column or any other shape which does not inhibit movement of weight 16 within passageway 11 of housing 10.

As discussed above, weight 16 is positioned within housing 10. Weight 16 has a first position 15 disposed within housing 10 between first end 12 and second end 14. Weight also has a second position 17 located within housing 10 proximate second end 14 of housing 10. When weight 16 is located at first position 15, the center of gravity of housing 10 will be positioned so that housing 10 will float with axis 13 oriented substantially perpendicular to gravity g. Thus, first position 15 of weight 16 should preferably be positioned so that when weight 16 is in first position 15, the center of gravity of housing 10 will be located at about the mid-point of housing 10, that is about half-way between first end 12 and second end 14.

When foam fitting 26 is used, it is also desirable that the mid-point of foam fitting 26 (the midpoint with respect to the dimension parallel to axis 13) be located at substantially the same point as the center of gravity of housing 10. When buoyant fishing device 1 is floating perpendicular to gravity g, foam fitting will be roughly half in the water and half out. However, if a fish begins to pull on line 18 (discussed below), housing 10 will pivot about its center of gravity. If that center of gravity is located at the mid-point of foam fitting 26, half of foam fitting 26 will be rotated below the surface of the water and half will be rotated above. Thus, foam fitting 26 will exert about the same amount of buoyant force to line 18. The same can be said for housing 18 if the center of gravity of housing 18 is located at the mid point of housing 18. Accordingly, as a fish pulls on line 18 and causes housing 10 to pivot, little if any additional force will be applied to line 18 by buoyant fishing device 1. This is advantageous for getting a fish to take the bait. If resistance were applied, it could either spook the fish or let the fish pull against the resistance, potentially freeing the bait from hook 20 (discussed below) before the fish has taken the bait completely into its mouth.

However, when weight 16 shifts to second position 17, the center of gravity of housing 10 will shift so that housing 10 will float with axis 13 oriented substantially parallel to gravity g. This will cause housing 10 to swing rapidly through about 45 degrees of motion, which may help set the hook 20 in the fish's mouth. Furthermore, in this position, any further force applied to line 18 will cause more of foam fitting 26 and housing 10 to be submerged, which in turn will exert an increasing buoyant force against any fish on line 18. Thus, after buoyant fishing device 1 is tripped, and presumably a fish is hooked, any effort of the fish to swim away will be resisted. This will at least inhibit the fish from swimming off with buoyant fishing device 1 and will also tend to tire the fish, making it easier to land when the fisherman arrives.

It is desirable that weight 16 not move freely from first position 15 to second position 17. Rather weight 16 will be maintained in first position 15 until a predeteiinined angle of axis 13 is reached. In order to maintain first position 15, weight 16 is engaged within housing 10. Weight 16 can be engaged by a clamp, a plurality of clamps, a lever or plurality of levers, adhesive, or in any other way that retains housing 10 in first position 15 until the predetermined angle of axis 13 is obtained.

In a preferred embodiment, weight 16 is engaged in first position 15 by a magnet 28. In this embodiment, weight 16 should also possess magnetism in addition to the characteristics detailed above.

Magnet 28 may be secured to housing 10 in a variety of ways, including simply wedging magnet 28 in place, securing it with screws or other conventional attachment devices, or casting housing 10 with magnet 28 in place. Magnet 28 may also be glued directly to housing 10. In one embodiment, magnet 28 is disposed within a coupling 34, preferably proximate the midpoint of coupling 34, preferably by gluing magnet 28 within coupling 34. Housing 10 may be formed of sections 10A and 10B that join, via coupling 34, at the desired location of magnet 28. When housing 10 is made of PVC or similar material, coupling 34 will preferably be formed of a like material. This will allow sections 10A and 10B to be joined by securing each section to coupling 34 using PVC adhesive, thereby forming a unitary and substantially water-tight housing 10, with magnet 28 positioned at the desired location. However magnet 28 is secured to housing 10, it will preferably be leak resistant and not inhibit flotation of buoyant fishing device 1.

Housing 10 should be configured to retain weight 16 within housing 10, preferably by closing first end 12 and second end 14. Housing 10 can be closed by utilizing caps 32 at first end 12 and second end 14. Caps 32 can be composed of the same material as housing 10. In a preferred embodiment, caps 32 are composed of polyvinyl chloride. Caps 32 can be attached to housing 10 mechanically, such as with threads or friction or by welding, gluing, cementing, using solvents or by any process which prevents detachment of caps 32 from housing 10. Additionally, caps 32 will preferably prevent water leakage into housing 10.

Housing 10 may also be fitted with one or more reflectors 22. Reflector 22 may be positioned on caps 32 proximate first end 12 and/or second end 14. Reflectors 22 will help the fisherman locate buoyant fishing devices in the dark. Furthermore, in one embodiment, reflector 22 proximate first end 12 is a different color than reflector 22 proximate second end 14. It will be appreciated that in the dark, a fisherman using a light may be able to see reflectors 22 well before he will be able to make out the rest of housing 10. If a fisherman can see reflectors 22 of both colors, he will know that buoyant fishing device 1 has not been tripped, whereas if he can see only one reflector 22, he will know that buoyant fishing device 1 has been tripped.

In one embodiment, buoyant fishing device 1 is provided with a light 50 proximate to first end 12, Light 50 will preferably be battery powered and may have a conventional bulb or an LED. Light 50 will preferably be configured to turn on when light 50 is substantially vertically oriented (i.e., parallel to gravity g) and to turn off otherwise. Light 50 will preferably be mounted on housing 10 so that light 50 will turn on when axis 13 of housing 10 is substantially parallel to gravity g and so that light 50 will turn off when axis 13 is substantially perpendicular to gravity g. Stated differently, light 50 should turn on when buoyant fishing device 1 is tripped. This may be accomplishing by providing light 50 with a tilt switch such as those available from Spectron Glass and Electronics, Inc. of Hauppauge, N.Y., USA. Light 50 should be water resistant and the battery and switch may be contained within housing 10 to protect them from the elements.

In an embodiment, second end 14 of housing 10 can be fitted with at least one line 18 and at least one hook 20 can be connected to line 18. Line 18 can be connected to second end 14 via a security 30. In an embodiment, security 30 can be tee shaped, and user can secure line 18 by wrapping line 18 around security 30.

Security 30 can be used to control the length of line 18 spooled off of buoyant fishing device 1. For example, consider a hypothetical line 18 of 40 feet in length and a body of water 20 feet in depth. If a fisheiman wanted to fish close to the bottom, he might spool off 21 to 22 feet of line 18. He could then secure line 18 to security 30 with one or more half-hitches, slip knots or the like. The remainder of line 18 will remain neatly spooled about buoyant fishing device 1 and any force applied to line 18 below security 30 will not cause line 18 to unroll from buoyant fishing device 1.

Line 18 can be composed of any conventional fishing line material such as monofilament, fluorocarbon, or braided nylon. Fishing line 18 will preferably be resistant to deterioration when in contact with water. The size or "test" strength of line 18 will vary depending upon the size and species of fish sought as well as water conditions. For example, in very clear water, transparent monofilament or fluorocarbon line may be desired in order make line 18 less visible.

Hook 20 can be composed of high-carbon steel, steel alloyed with Vanadium, stainless steel or any other material suitable for fresh-water or salt-water fishing. A plurality of hooks 20 can be positioned on line 18 such that hooks 20 are six inches apart, one foot apart or any length which allows multiple fish to attach to line 18.

Housing 10 is preferably configured to release weight 16 when axis 13 of housing 10 reaches an optimal angle Θ relative to the direction of gravity. It should be noted that the angle between axis 13 and gravity is the complement of the angle between axis 13 and the surface of the water body when buoyant fishing device 1 is in use. Selection of optimal angle Θ will depend upon numerous design objectives. The smaller angle Θ is and thus the closer axis 13 must be brought to vertical, the more vigorously a fish must pull on line 18 before weight 16 will be released. Similarly, it is desirable that angle Θ be small enough that it will not be reached by ordinary wave action or the action caused by the wakes of passing water craft. Thus, a small angle Θ will result in relatively fewer false indications that buoyant fishing device 1 has a fish on. However, it can be desirable for buoyant fishing device 1 to trip before buoyant fishing device has been pulled into a nearly vertical position. For example, if a fish has been "nibbling" at the bait, it may succeed in removing the bait from hook 20, even though no fish is on. In such an instance, it may be useful to the fisherman if buoyant fishing device 1 is tripped. This should cause the fisherman to check the line and thereby alert him to the fact that hook 20 needs to be rebaited. Similarly, hook 20 may snag a relatively small fish. Depending upon the relative size of the fish and housing 10, the fish may have difficultly pulling on line 18 hard enough to tip housing 10 to angle Θ. This may result in the fisherman not realizing that he needs to check buoyant fishing device 1 when it does in fact have a fish on the line. A larger angle Θ will allow buoyant fishing device 1 to be tripped with less pull. The result will be more false positives but fewer missed instances in which the line needs to checked (i.e., fewer false negatives). Where the balance lies will vary in different fishing conditions and with different fish. However, the inventor's preference is an angle Θ of between about 30 and 60 degrees, most preferably about 45 degrees.

In the embodiment in which weight 16 is secured in first position 15 using magnet 28, the optimal angle Θ may be set by varying several conditions. Principally, these will include the mass of weight 16 and the strength of magnet 28. However, a coating could be provided to weight 16 and/or magnet 28, which would diminish the attraction between magnet 28 and weight 16. This would tend to increase angle Θ, resulting in an earlier release of magnet 28. Similarly, a coating of latex, rubber, or other material could be provided to weight 16 and/or passageway 11, to increase the friction between weight 16 and passageway 11. This would tend to decrease angle Θ, resulting in a later release of weight 16.

In the preferred embodiment, the release of magnet 28 at an optimal angle of about 45 degrees is accomplished by providing housing 10 with a magnet 28 of about 700 Gauss and a weight 16 of about 4.1 ounces. Suitable magnets are available from McMaster Can of Robbinsville, N.J., USA. Similarly, weight 16 comprising an uncoated piece of ½ inch diameter rebar about 4⅜ inches in length will have the desired weight, 4.1 ounces. The magnetism, measured in Gauss, of preferred magnet 28 and weight, measured in ounces, of weight 16 have a ratio of about 170:1. A magnet 28 and weight 16 having this preferred magnetism to weight ratio will result in magnet 28/weight 16 system in which the magnetic attraction binding them together will be overcome when an angle of about 45 degrees relative to the direction of gravity is obtained.

In operation, buoyant fishing device 1 will be set out with line 18 depending from second end. At least one baited hook 20 will be attached to line 18. Line 18 may be free floating in the water column or buoyant fishing device 1 and line 18 may be secured to the bottom by a sinker 24. When a fish takes baited hook 20 and becomes ensnared thereon, the fish will pull on line 18. This will cause housing 10 of buoyant fishing device 1 and axis 13 thereof to tilt so that axis 13 becomes more aligned with the direction of gravity until a predetermined angle Θ is reached. When angle Θ is obtained, weight 16 will be released so that it will fall from first position 15 to second position 17 via passageway 11. With weight 16 in second position 17, buoyant fishing device 1 can be said to have been tripped. This will cause buoyant fishing device 1 to float so that axis 13 of housing 10 is substantially aligned with the direction of gravity. Thus, by the change in the orientation of buoyant fishing device 1, a fisherman will be able to visually tell that buoyant fishing device 1 has been tripped.

If foam fitting 26 is used, it will increase the buoyancy of buoyant fishing device 1. A hooked fish will commonly try to dive. The increased buoyancy provided by foam fitting 26 will increase resistance to the fish's efforts to dive. This will result in the fish being more rapidly tired, thereby facilitating landing the fish when buoyant fishing device 1 is run.

The fisherman will run buoyant fishing device 1 by manually pulling the fish to the surface via line 18. The fish may be removed and hook 20 rebaited if desired. Buoyant fishing device 1 may be returned to an untripped condition simply by tilting housing 10 so that weight 16 will slide from second position 17 back to first position 15, where it will be secured. Buoyant fishing device 1 may be returned to the water to continue fishing.

Alternatively, if the fisherman is ready to quit fishing, he may coil line 18 around housing 10, once the fish is removed. Where foam fitting 26 is provided, hook 20 may be stuck into foam fitting 26 to secure line 18 in a coiled condition, providing a convenient package for transporting fully rigged buoyant fishing device 1 with the sharp end of hook 20 safely covered while simultaneously reducing the risk of tangling line 18.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

I claim:

1. A buoyant fishing device comprising:
   a. a housing having a first end and a second end and containing an elongated passageway having an axis;
   b. at least one weight disposed within said passageway, said weight having a first position within said housing between said first end and said second end and a second position within said housing located proximate to said second end of said housing;
   c. a magnet secured within said passageway proximate said first position and wherein at least a portion of said weight is magnetic, whereby said weight may be secured in said first position by the interaction of said magnet and said magnetic portion of said weight;
   d. wherein said housing is configured to engage and secure said weight in said first position when said axis of said passageway is substantially perpendicular to gravity, and wherein said housing is further configured to release said weight when said axis is tilted to a preselected optimal angle with respect to gravity, whereby said weight may slide from said first position to said second position via said passageway;
   e. wherein said housing is further configured to float with said axis oriented substantially perpendicular to gravity when said weight is in said first position and wherein said housing is further configured to float with said axis oriented substantially parallel to gravity when said weight is in said second position; and
   f. at least one line operatively connected proximate to said second end of said housing, said line attached to at least one hook, whereby pressure exerted on said line via said hook when said housing is floating will cause said housing and said axis to tilt.

2. The buoyant fishing device of claim 1 wherein said optimal angle is from about 70 degrees to about 30 degrees.

3. The buoyant fishing device of claim 1 wherein said optimal angle is from about 60 degrees to about 40 degrees.

4. The buoyant fishing device of claim 1 wherein said optimal angle is about 45 degrees.

5. The buoyant fishing device of claim 1 wherein said fishing device is weighted by a sinker.

6. The buoyant fishing device of claim 1 wherein said buoyancy is provided at least in part by a foam fitting.

7. The buoyant fishing device of claim 1 wherein said housing is buoyant.

8. The buoyant fishing device according to claim 1 wherein said housing has a center of gravity and a mid-point and wherein said weight is sized to position said center of gravity at about the mid-point of said housing when said weight is in said first position.

9. The buoyant fishing device according to claim 1 where said buoyancy is provided at least in part by a foam fitting.

10. The buoyant fishing device according to claim 9 wherein said foam fitting has mid-point and wherein said foam fitting is positioned relative to said housing to position said midpoint of said foam fitting at about the location of said center of gravity of said housing when said weight is in said first position.

11. A method of fishing using a buoyant fishing device comprising a housing having a first end and a second end and containing an elongated passageway having an axis, at least one weight disposed within said passageway, said weight having a first position within said housing located between said first end and said second end of said housing and a second position within said housing located proximate to said second end of said housing, wherein said housing is configured to magnetically engage and secure said weight in said first position when said axis of said passageway is substantially perpendicular to gravity, and wherein said housing is further configured to release said weight when said axis is tilted to an optimal angle with respect to gravity, whereby said weight may slide from said first position to said second position via said passageway, wherein said housing is further configured to float with said axis oriented substantially perpendicular to gravity when said weight is in said first position and wherein said housing is further configured to float with said axis oriented substantially parallel to gravity when said weight is in said second position, at least one line operatively connected proximate to said second end of said housing, said line attached to at least one hook, whereby pressure exerted on said line via said hook when said housing is floating will cause said housing and said axis to tilt; said method comprising:
   a. positioning said buoyant fishing device upon the surface of a water body with said weight in said first position whereby said buoyant fishing device will float with said axis of said housing oriented substantially perpendicular to gravity;
   b. baiting said at least one hook on said line;
   c. putting said baited hook in the water body;
   d. observing said buoyant fishing device until said axis of said housing becomes oriented substantially parallel to gravity;
   e. checking for the presence of fish on said at least one hook.

12. A buoyant fishing device comprising:
a. a housing having a first end, a second end, and an elongated passageway with an axis;
b. at least one weight disposed within said passageway, said weight having a first position within said housing between said first end and said second end and a second position within said housing located proximate to said second end of said housing;
c. a magnet secured within said passageway proximate said first position and wherein at least a portion of said weight is magnetic, whereby said weight may be secured in said first position by the interaction of said magnet and said magnetic portion of said weight, wherein said magnet has a magnetism measured in gauss and said weight has a weight measured in ounces, said magnetism and said weight having a ratio of about 170:1 (gauss:ounces);
d. wherein said housing is configured to engage and secure said weight in said first position when said axis of said passageway is substantially perpendicular to gravity, and wherein said housing is further configured to release said weight when said axis is tilted to a preselected optimal angle with respect to gravity, whereby said weight may slide from said first position to said second position via said passageway;
e. wherein said housing is further configured to float with said axis oriented substantially perpendicular to gravity when said weight is in said first position and wherein said housing is further configured to float with said axis oriented substantially parallel to gravity when said weight is in said second position; and
f. at least one line operatively connected proximate to said second end of said housing, said line attached to at least one hook, whereby force exerted on said line via said hook when said housing is floating will cause said housing and said axis to tilt.

* * * * *